United States Patent [19]

Lu

[11] Patent Number: 5,183,597
[45] Date of Patent: Feb. 2, 1993

[54] METHOD OF MOLDING MICROSTRUCTURE BEARING COMPOSITE PLASTIC ARTICLES

[75] Inventor: Shih-Lai Lu, St. Paul, Minn.

[73] Assignee: Minnesota Mining and Manufacturing Company, St. Paul, Minn.

[21] Appl. No.: 660,643

[22] Filed: Feb. 25, 1991

Related U.S. Application Data

[63] Continuation-in-part of Ser. No. 444,361, Dec. 8, 1989, which is a continuation-in-part of Ser. No. 309,415, Feb. 10, 1989, abandoned.

[51] Int. Cl.$^5$ .............................................. B29D 11/00
[52] U.S. Cl. ...................................... 264/1.4; 264/1.7; 264/1.9; 264/22; 264/106
[58] Field of Search ............... 264/1.3, 1.4, 1.6, 1.7, 264/1.9, 106, 107, 22

[56] References Cited

U.S. PATENT DOCUMENTS

| | | | |
|---|---|---|---|
| 3,689,346 | 9/1972 | Rowland | 156/245 |
| 4,354,998 | 10/1982 | Bricot | 264/22 |
| 4,374,316 | 2/1983 | Kerfeld | 264/22 |
| 4,414,316 | 11/1983 | Conley | 430/496 |
| 4,420,502 | 12/1983 | Conley | 427/54.1 |
| 4,477,529 | 10/1984 | Campbell | 428/412 |
| 4,576,850 | 3/1986 | Martens | 428/156 |

FOREIGN PATENT DOCUMENTS

63-14341 7/1986 Japan.

OTHER PUBLICATIONS

Progress in the development of prism light guides, Steven G. Saxe, SPIE vol. 692, Materials and Optics for Solar Energy Conversion and Advanced Lighting Technology (1986).

*Primary Examiner*—James Lowe
*Attorney, Agent, or Firm*—Gary L. Griswold; Walter N. Kirn; Steven E. Skolnick

[57] ABSTRACT

A microstructure-bearing composite plastic article can be superior, both in microstructure and in physical properties, when it is a composite of a tough, flexible substrate, at a surface of which is microstructure formed of a cured oligomeric resin having hard segments and soft segments, which cured resin is substantially confined to the microstructure portion of the composite. Such a composite plastic article can be made by depositing an uncured oligomeric resin composition onto a master negative molding surface, filling the cavities by moving a bead of the composition between a substrate and the master, and curing the deposited composition by ultraviolet radiation while keeping the temperature during curing from rising not more than about 30° C. above a typical use temperature of the finished composite plastic article. Alternatively, instead of regulating the temperature during curing, the article can be made by limiting the resin composition to an amount which does not protrude above the cavities by more than 20% of the cavity depth.

18 Claims, 1 Drawing Sheet

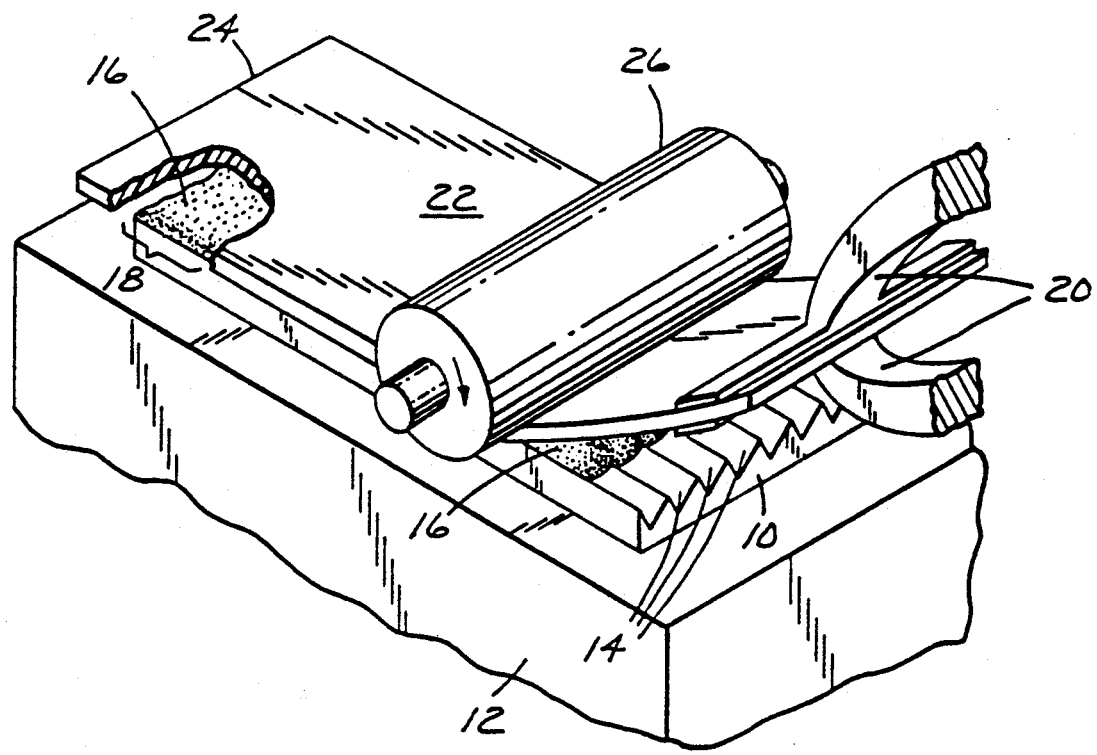

METHOD OF MOLDING MICROSTRUCTURE BEARING COMPOSITE PLASTIC ARTICLES

CROSS REFERENCE TO RELATED APPLICATIONS

This is a continuation-in-part of copending application Ser. No. 07/444,361, filed Dec. 8, 1989 which, in turn, is a continuation-in-part of copending application Ser. No. 07/309,415 filed Feb. 10, 1989, now abandoned.

BACKGROUND OF THE INVENTION

1. Field of the Invention

The invention concerns plastic articles, the surfaces of which bear microstructure, such as retroreflective cube-corner sheeting, Fresnel lenses, total internal reflecting films, intermeshable articles, information carrying discs, and the like. The invention also concerns an improved method of making such plastic articles.

2. Description of the Related Art

U.S. Pat. No. 3,689,346 (Rowland) teaches a process for the continuous replication of retroreflective cube-corner sheeting by depositing a crosslinkable, partially polymerized resin on a master negative molding surface and employing actinic light or heat to solidify the resin, thus replicating the surface. The resins used typically exhibit relatively high levels of shrinkage upon solidifying or curing, thus giving rise to optical imperfections in the cube-corner microstructure.

U.S. Pat. No. 4,576,850 (Martens) states, "An article comprising crosslinked polymer with hard and soft segments or moieties having a microstructure-bearing surface is prepared by a process comprising filling a mold master, bearing or encoded with microstructure to be replicated, with a fluid, castable, one-part, preferably solvent-free, radiation addition-polymerizable, crosslinkable, organic oligomeric composition (or precursors thereof) having 'hard' segments and 'soft' segments, exposing the resulting cast compositions to radiation, preferably actinic radiation such as ultraviolet radiation, and thereby forming said articles, e.g., a retroreflective cube-corner sheeting, Fresnel lens or video disc." (See Abstract). In addition to the hard ("H") and soft ("S") segments, the composition preferably includes one or more "E" precursors "containing a radiation sensitive addition-polymerizable, functional group such as acrylyl, methacrylyl, allyl or vic-epoxy group" (col. 4, ls. 63–66). The composition may also contain diluting monomers which "are addition-polymerizable monomers, viz., ethylenically unsaturated monomers and vic-epoxy reactive diluents. The diluting monomers contribute to the 'H', 'S' or 'E' content of the oligomeric composition" (col. 36, ls. 10–12). The composition may include an addition-polymerization catalyst, preferably a photopolymerization catalyst at about 0.25 to 1.0% of the oligomeric composition.

Almost every example of the Martens patent tests the ability of the oligomeric composition to replicate a diffraction grating master or a video disc master (Example 22), both of which have fine microstructure. The exceptions are Example 20, which reports the replication of cube corners 0.128 mm in depth, and Example 21, which reports the replication of a Fresnel lens, both of which have relatively large microstructures, i.e., several magnitudes greater than that of the diffraction grating. Because a curable resin composition shrinks when cured, it can be more difficult to replicate with precision relatively large microstructures like those of Martens' Examples 20 and 21, as compared to the fine microstructures of the masters used in other examples.

In Example 20 of Martens, a platen press at 70° C. forced the curable mixture into the cube corner depressions, and the thickness of the cured oligomeric resin was 0.25 mm, nearly twice the 0.128 mm depth of the microstructure. In Example 21, the oligomeric resin composition was applied at a thickness substantially in excess of the depth of the Fresnel lens elements in order to result in a self-supporting Fresnel lens after the polyester sheet was stripped off.

U.S. Pat. No. 4,374,077 (Kerfeld) specifically concerns information carrying discs such as laser readable video discs which, as noted above, have a fine microstructure. Kerfeld teaches that these discs "can be deposited between a stamper and a substrate to which the polymerized mass is to adhere. The photopolymerizable mass is deposited by moving a bead or wave of the photopolymerizable liquid between a flexible substrate or flexible stamper and the corresponding optical disc stamper or substrate so as to fill the pattern in the stamper and then irradiating the photopolymerizable mass, through either the stamper or the substrate . . . . The advancement of the bead of liquid by the substrate being rolled out over the master has been found to remove substantially all of the air in the mold. The leading edge of the bead tends to pick up and carry the air without re-depositing it in progressive features of the master because the air bubbles rupture, releasing the gas . . . . As long as the substrate or master is able to bend sufficiently to enable the formation of a bead and propagation of that bead as the bend-point is moved forward, the substrate or master is sufficiently flexible" (col. 2. lines 3–68). Substrates used in the Kerfeld examples are flexible films of polyester, poly(vinyl chloride), and poly(methyl methacrylate).

U.S. Pat. No. 4,414,316 (Conley) concerns plastic articles, the surfaces of which replicate relatively large microstructures such as Fresnel lenses. In Examples 1 and 3, a polyester film is coated with a UV-curable resin that is pressed against a lenticular pattern and cured by directing ultraviolet radiation through the polyester film while the resin is in contact with the molding surface. FIG. 2 shows that in the resulting products, the thickness of a layer 12 of cured oligomeric resin is large compared to the depth of lenticular formations 13. The UV-curable resin preferably is an acrylate urethane polyester oligomer. See also U.S. Pat. No. 4,420,502 (Conley).

SUMMARY OF THE INVENTION

The present invention concerns a composite plastic article having at least one microstructured surface containing a plurality of utilitarian discontinuities ranging in depth from at least 0.025 mm to as great as about 0.5 mm. The composite plastic article of the invention is believed to be superior in flexibility and toughness to any replicated thermoplastic article now on the market that has relatively large microstructure (i.e., at least 0.025 mm). The composite plastic article is believed to be superior in replication fidelity to radiation-cured articles described in the above-cited prior art.

As used herein, the term utilitarian means that the discontinuities provide a positive contribution to the functioning of the article. Optically utilitarian discontinuities provide a positive contribution to the function of an optical device. Representative examples of devices having optically utilitarian discontinuities include, but are not limited to, cube-corner reflective sheeting, refractive or diffractive Fresnel lenses, and films bearing a series of parallel linear prisms with planar facets.

The composite plastic article of the invention is characterized by a tough, flexible substrate, one face of which bears microstructure of a depth of at least 0.025 mm, the microstructure comprising a flexible, cured oligomeric resin having hard segments and soft segments, which cured oligomeric resin is substantially confined to the microstructure portion of the composite. By "tough, flexible" is meant that the substrate has a tensile strength of at least approximately 1500 MPa and can be bent to a radius of 3 cm or less without breaking.

Useful oligomeric resin compositions which cure to a flexible state include, but are not limited to, acrylate, epoxy or urethane based materials, but preferably they are acrylate based materials. As used herein "acrylate" encompasses methacrylate. By a "flexible state" is meant that a film of the cured oligomeric resin 0.25 mm in thickness can be bent to a radius of 3 cm or less without breaking.

The invention also concerns a method (hereinafter referred to at times as method I) for making the novel microstructure-bearing composite plastic article. Method I comprises the following steps:
a) preparing a one-part, solvent-free, radiation-polymerizable, crosslinkable, organic oligomeric resin composition having hard segments and soft segments;
b) depositing a bead of the oligomeric resin composition along one edge of a master negative microstructure molding surface;
c) covering the master with a preformed substrate, at least one of the master and the substrate being flexible;
d) applying force progressively to the substrate to advance the bead of resin while applying sufficient pressure to fill the cavities of the master such that the deposited resin does not protrude beyond the cavities to more than 20% of the depth of the cavities;
e) curing the deposited oligomeric resin by ultraviolet radiation to provide a composite of said substrate and cured oligomeric resin; and
f) removing the resulting microstructure-bearing compositite of the substrate and cured resin.

The invention may also be made by a method (hereinafter referred to at times as method II) which comprises the following steps:
a) preparing a UV-curable oligomeric resin composition of a one-part, solvent-free, radiation addition-polymerizable, crosslinkable, organic oligomeric composition having hard segments and soft segments;
b) depositing a bead of that oligomeric resin composition along one edge of a master negative microstructure molding surface;
c) covering the master with a preformed substrate, at least one of the master and substrate being flexible;
d) applying force progressively to the substrate to advance the bead of resin while applying sufficient pressure to fill the cavities of the master;
e) curing the deposited oligomeric resin by ultraviolet radiation to provide a composite of said substrate and cured oligomeric resin while keeping the temperature adjacent to the surface of the deposited oligomeric resin from rising to not more than about 30° C. above a typical use temperature of the finished composite plastic article; and
f) removing the resulting microstructure-bearing composite of the substrate and cured resin.

As taught in the Martens patent, the oligomeric resin composition of step a) of either method I or method II can be a one-part, solvent-free, radiation addition-polymerizable, crosslinkable, organic oligomeric composition having hard segments and soft segments plus a photoinitiator at from about 0.1 to 0.5% by weight of the resin composition. The hard segments preferably are polyurethane and the soft segments preferably are polyester.

The viscosity of the reactive oligomeric resin composition as deposited in step b) of either method I or method II should be within the range of about 1,000 to 5,000 cps. Above that range, air bubbles might be entrapped, and the resin might not completely fill the cavities of the master. If an attempt were made to obtain a viscosity below that range, the overall equivalent weight (weight per number of reactive groups) of the oligomeric resin typically would be so low that the resin would experience shrinkage upon curing to such an extent that the cured oligomeric resin would not faithfully replicate the master molding surface. Preferably, the viscosity of the resin is from 2,000 to 3,000 cps. Within that preferred range, the oligomeric resin composition should completely fill the cavities without any need to apply more than hand pressure. However, when the cavities are unusually deep and/or narrow, it may be desirable to reduce the viscosity below about 2,000 cps, because some shrinkage is to be preferred over any failure to fill the cavities completely.

In order to achieve the desired viscosity, it usually is necessary to include a reactive monomer in the oligomeric resin composition. When the oligomeric resin composition is acrylate-based, the reactive monomer may be an ethylenically unsaturated monomer such as an alkyl acrylate or other examples revealed in the Martens patent. The relative amounts of oligomer and monomer should be controlled so that the overall equivalent weight of the composition is not so low that there is unacceptably high shrinkage upon curing.

Polycarbonate film is a preferred substrate for use in step c) of either method I or method II. Polycarbonate is economical, optically clear, and has good tensile strength. When its thickness is from about 0.1 to 1.2 mm, it has sufficient strength and flexibility to permit it to move a bead of the oligomeric composition across a rigid master negative molding surface.

In addition to polycarbonate, useful substrates for the microstructure-bearing composite plastic articles of the invention include cellulose acetate butyrate, cellulose acetate propionate, poly(ether sulfone), poly(methyl methacrylate), polyurethane, polyester, poly(vinylchloride), glass, metal, and paper. The surface of such substrates may first be treated to promote adhesion to the oligomeric resin.

In step d) of method I, sufficient pressure should be applied to squeeze out excess resin so that the resin thickness above the cavities is less than about 20% of the depth of the cavities, preferably no greater than about 10%. By maintaining a minimum resin thickness, the heat rise during curing can be kept to a minimum. When the amount of the oligomeric resin composition remaining after step d) is substantially more than sufficient to fill the cavities (e.g., protrudes above the cavities by more than 20% of their depth) and the temperature is not controlled, the resulting composite plastic articles have not faithfully replicated the master molding surface. Furthermore, larger amounts of the oligomeric resin composition would be uneconomical since the oligomeric resin typically is much more expensive than the substrate material. As explained more fully hereinbelow, the need to control the resin depth is far less important in method II.

During step e) of either method I or method II, heat from the curing source and the heat of reaction can cause the temperature of the oligomeric resin composition, the substrate and the master to rise prior to completion of the cure. When the cured oligomeric resin and the substrate comprising the composite plastic article are removed from the master and allowed to cool to ambient temperature, they shrink. Shrinkage of the resin and the substrate can produce distortion of the microstructured pattern and poor reproduction fidelity especially when the coefficients of thermal expansion of the resin and the substrate are not approximately equal. While some distortion and poor reproduction fidelity can be tolerated in mechanical applications, they are less tolerable when the composite plastic article has optically utilitarian discontinuities.

Thus, it is desirable to control the temperature rise during step e) of either method I or method II. The temperature rise during step e) may be effectively controlled either by regulating the thickness of the oligomeric resin or by regulating the temperature during the curing process. As noted above, if the deposited resin does not protrude beyond the cavities to more than 20% of the depth of the cavities (step d) of method I), the temperature rise during step e) can be kept to a minimum. Alternatively, as employed in method II, the temperature adjacent to the surface of the oligomeric resin may be limited during step e) so as to rise not more than about 30° C. above a typical use temperature of the finished composite plastic article. The typical use temperature of the finished composite plastic article is about room temperature (approximately 20°-25° C.). Therefore, the temperature adjacent to the surface of the resin should be limited during step e) of method II so as to not rise substantially above about 50° C. If the temperature of the oligomeric resin composition during step e) of method II were allowed to rise substantially above 50° C., shrinkage and imperfect replication might result. When method II is employed, control of the resin thickness to no more than about 20% beyond the cavity depth is far less important.

The temperature during step e) of method II may be restricted so as to not rise substantially above 50° C. by several techniques. For example, the ultraviolet lamp or lamps used during the curing process may be water-cooled and the air adjacent the curing resin may be kept moving. When the oligomeric resin composition is polymerized by radiation, the temperature can be further controlled in any of a number of ways, e.g., by passing the radiation through a heat filter, by cooling the air adjacent the curing resin, by cooling the mold with a suitable heat exchange medium, by cooling the oligomeric resin composition before application to the mold, by controlling the intensity of radiation, and when employing actinic radiation, by restricting the amount of photoinitiator.

When employing actinic radiation, the amount of the photoinitiator preferably is about 0.1 to 1%, more preferably no more than 0.5% by weight of the resin composition. When the amount of the photoinitiator is less than 0.1% by weight of the resin composition, the polymerization might proceed at an uneconomically slow rate. When the actinic radiation is ultraviolet, preferred photoinitiators include derivatives of acetophenone, such as the commercially available compounds 1-hydroxycyclohexyl acetophenone (IRGACURE 184, a solid available from Ciba-Geigy), and 2-hydroxy-2-methyl propiophenone (DAROCUR 1173, a liquid available from EM Industries).

The intensity of radiation should be selected such that it completely cures the oligomeric resin composition at an economically rapid rate of production. When the depth of the microstructure is close to 0.025 mm, it usually is possible to complete the curing within about one second while keeping the temperature of the oligomeric resin composition below 50° C. if method II is practiced. Greater depths of the microstructure require longer times of exposure in order to keep the temperature desirably low, e.g., about 10 seconds for a depth of about 0.5 mm.

In practicing method II by cooling the oligomeric resin composition to control the temperature of the process, the viscosity of the resin rises and can become too high for easy delivery to the master. When the temperature of the master molding surface is lowered, such as by placing the master in contact with a cooled heat exchange fluid, the adhesion of the polymerized resin usually increases and may become too high to allow clean removal from the master, especially when the mold is metal. Better release is obtained from a thermoplastic master that has a surface energy below 33 dynes/cm.

A preferred master for use in the above-outlined method of the invention is a sheet of thermoplastic resin that is stable to the curing conditions and has been embossed by a metallic master tool such as nickel-plated copper or brass. Such a thermoplastic master is relatively inexpensive and yet can be used to form a few thousand composite plastic articles of the invention before becoming unduly worn.

When the thermoplastic master is made from a radiation-transparent thermoplastic material, the reactive oligomeric resin can be cured by being irradiated through the master. By using a radiation-transparent master, substrates for the composite plastic articles of the present invention can be opaque, e.g., have a reflective metallic or other coating or decorative imprinting or be impregnated with a pigment or dye. The substrates can have any thickness. A thermoplastic master can have sufficient body and flexibility to permit it to move a bead of the oligomeric composition across the substrate, which accordingly can be rigid.

When the master is made from a radiation-transparent thermoplastic resin such as a polyolefin, it is possible to prepare composite plastic articles bearing microstructures on both surfaces of the substrate.

By being made of thermoplastic resin, the master can have a low-energy surface that affords good release from a cured oligomeric resin. Good release is assured when there is a significant difference in surface energy between the surfaces of the master and the cured oligomeric resin, the latter typically being about 40-41 dynes/cm. Because the surface energy of each of polypropylene and polyethylene is about 30-31 dynes/cm, these afford easy separation of the cured oligomeric resin. However, when polypropylene is corona treated, its surface energy increases to about 44 dynes/cm, thus making it less suitable for use in a molding master but a good candidate for the substrate of a novel microstructure-bearing composite plastic article. Poly(vinylchloride) and cellulose acetate butyrate, both of which are about 39-42 dynes/cm in surface energy also provide good bonding with the cured microstructure but could not be used as the master molding surface without a release agent. Polyolefins are more transparent to and stable towards ultraviolet radiation than are poly(vinylchloride) and cellulose acetate butyrate.

A particularly preferred material for use in a master is a laminate of polyethylene and polypropylene which has been embossed with the polyethylene layer in contact with the metallic master tool at a temperature above the softening point of the polyethylene and below that of the polypropylene. The polypropylene layer of the laminate affords the strength and flexibility needed to permit it to move a bead of the oligomeric composition across a rigid master negative molding surface, and the polyethylene layer provides a low glass transition temperature and melt temperature to facilitate replication of the original master tool.

The composite plastic article of the invention can bear a linear prism microstructure to be a total internal reflecting film (TIRF). A preferred TIRF has a polycarbonate substrate about 0.1 to 0.25 mm in thickness and a microstructure from 0.05 to 0.2 mm in depth. Such a TIRF can be rolled up to form a light pipe 2 to 3 cm in diameter without crazing or breaking. In comparison, prior art TIRF made of polycarbonate film, one surface of which has a linear prism microstructure, cannot be rolled to less than about 7.5 cm in diameter without crazing or breaking. Preferred microstructure for light pipes has been described in SPIE Proceedings, Vol. 692, p. 235 (1986).

Plastic articles of the invention include cube-corner retroreflectors, Fresnel lenses, and other lenticular microstructures.

T-Test Value

The optical quality of a TIRF can be evaluated with apparatus including a laser (Spectra-Physics Inc. Model 117A) with a spatial filter, a beam expander, and a collimator. Two diaphragms or irises are placed 18 and 38 cm from the laser, and an annular sample holder with an opening 6.35 cm in diameter is placed 84 cm from the laser. Directly behind the sample holder is an integrating sphere (with a 1 cm diameter aperture) and a LABSPHERE ML-400 radiometer. Using the diaphragms or irises, the laser is focused through the aperture to obtain a clean circle of light of about 3 mm diameter on a black surface mounted on the sample holder. A source intensity measurement of 100% is taken with no sample in place. The TIRF to be tested is then mounted on the sample holder with its flat surface facing the laser and its grooves extending vertically. Unless otherwise reported, T-Test Values are measured at ambient temperature. Readings are then made at from 12 to 15 different points on the TIRF within a 5 cm diameter area while making sure that none of the light strikes the frame of the sample holder. The readings are averaged and multiplied by 100 to give percent transmission which is the T-Test Value of the TIRF sample. T-Test Value is a criterion of the fidelity of replication of a TIRF. Smaller T-Test Value percentages indicate better fidelity of replication than larger percentages. Perfect replication would result in a T-Test Value of 0%.

A T-Test Value of 5% or less indicates that the TIRF is substantially totally internally reflecting. However, in some instances, a T-Test Value of about 2% or less may be required. For example, a relatively short light pipe (e.g. about 33 cm in length) may be substantially totally internally reflecting if it demonstrates a T-Test Value of about 5% whereas a much longer tube would demand a lower T-Test Value to achieve equivalent total internal reflection. Furthermore, commercial expectations may demand a lower T-Test Value even though a larger value would provide a useful article.

Interferometry Fringe Curvature Test (Curve Value)

An individual groove face of a TIRF can be studied by reflectance interferometry in a microscope, with a monochromatic light source. By proper adjustment of the interferometer, the field of view shows a number of evenly spaced alternating dark and bright bands (fringes) aligned nominally perpendicular to the groove direction. The repeating distance between dark bands corresponds to one half of the wavelength of the light source. If the groove face is perfectly flat, the fringes will be straight lines. If the groove face is not flat, e.g., due to distortion of the replication layer, the fringes will be curved. From a photograph of the interferogram, the amount of curvature can be measured and compared to the inter-fringe spacing. The curvature can then be expressed as a number of wavelengths of deviation from straight (i.e., "Curve Value"). The Curve Value corresponds directly with the number of wavelengths of deviation from flatness of the groove face.

BRIEF DESCRIPTION OF THE DRAWING

The invention may be more easily understood with reference to the drawing, the single figure of which is a schematic isometric illustration of a method of producing microstructure-bearing composite plastic articles of the invention.

In the drawing, a TIRF master 10, with grooves 14 facing upwardly, is laid on a flat table 12. A bead of UV-curable resin 16 is deposited across one edge 18 of the grooves 14. A clamp 20 is fastened along one edge of a flexible, transparent, plastic film 22 and an opposite edge 24 of the plastic film is laid onto the bead of resin to extend slightly beyond the edge 18. A hard rubber roller 26 is brought into contact with the opposite edge 24 of the plastic film 22 and rolled across the plastic film, thus advancing the bead of resin 16 to fill the grooves 14. After the UV-curable resin has been cured by being exposed to ultraviolet radiation through the plastic film 22, the clamp 20 is lifted to peel the resulting microstructure-bearing composite plastic article from the master 10, thus enabling the master to be reused.

DESCRIPTION OF THE PREFERRED EMBODIMENTS

In the examples, all parts are given by weight.

EXAMPLE 1

A liquid UV-curable oligomeric resin composition having a viscosity of 1600 cps was prepared by blending together:

| Reactants | Parts |
| --- | --- |
| Acrylate-capped polycaprolactone urethane oligomer | 54.3 |
| N-vinyl pyrrolidone | 16.3 |

-continued

| Reactants | Parts |
|---|---|
| [(2-ethoxy)-2-ethoxy]ethyl acrylate | 11.3 |
| 1,6-hexanediol diacrylate | 5.7 |
| N-(isobutoxy methyl)acrylamide | 11.1 |
| Tertiary amine mixture (TINUVIN 292) | 1.0 |
| 1-hydroxycyclohexyl acetophenone | 0.25 |

The acrylate-capped polycaprolactone urethane oligomer was prepared as described in Examples 1–6 of the Martens patent except that 0.75 mole of polycaprolactone triol (NIAX PCP-310) was employed in addition to the 1.5 moles of the diol, and 2-hydroxyethyl acrylate was employed instead of the methacrylate.

Used as a master negative molding surface was a laminate of polyethylene (0.375 mm) and polypropylene (1.0 mm), the polyethylene surface of which had been embossed by a nickel-plated copper master tool to have a total internal reflecting pattern of linear prisms 0.175 mm deep and 0.35 mm peak-to-peak.

As illustrated in FIG. 1, liquid UV-curable oligomeric resin composition was poured along one edge of the molding surface and overlaid with a polycarbonate film 0.25 mm in thickness. Then, using a rubber roller, excess oligomeric resin composition was squeezed out, leaving about 0.025 mm overlying the peaks of the prisms (i.e., the excess resin was approximately 14% of the prism depth). This was irradiated through the polycarbonate substrate using 3 passes under an uncooled medium-pressure mercury lamp of 350–380 mm, 200 watts per linear inch (82 watts per linear cm) of arc (UVEXS model LCU 750 UV processor) 4 cm from the surface of the deposited oligomeric resin composition, thus providing a total exposure of about 5 seconds corresponding to a dosage range of from about 200 to 400 mJ/cm$^2$.

The resulting microstructure-bearing composite TIRF was peeled from the master molding surface and had a T-Test Value of 3.5%. It was used to make a light pipe by rolling two pieces and inserting them in abutting relation into a rectangular enclosure 4.4 cm on each side and approximately 63 cm in length. Three sides of the enclosure were pigmented poly(methyl methacrylate) resin, and the fourth side was a polycarbonate diffusing film. At one end of the enclosure was a mirror and at the other end was a small collimated light source. Approximately 9.5 cm of the diffusing film extended from the end of the enclosure supporting the light source and was covered with black tape to allow light intensity measurements to be taken along the remainder of the diffusing film. Light meter readings, which are reported in Table A, were taken at 2.5 cm intervals along the length of the diffusing film beginning at a distance of 35.1 cm from the light source. Test Point 11 was 60.5 cm from the light source or 2.5 cm from the mirror. The high values at Test Points 9 and 10 are attributed to the two pieces being abutted against each other between Test Points 9 and 10. Table A summarizes initial test data as well as data obtained approximately 30 days after the TIRF was prepared.

TABLE A

| Test Point | Light-meter Readings Initial | 30 Day |
|---|---|---|
| 1 | 216 | 217 |
| 2 | 206 | 204 |
| 3 | 204 | 197 |
| 4 | 196 | 196 |
| 5 | 193 | 198 |
| 6 | 194 | 199 |
| 7 | 200 | 205 |
| 8 | 210 | 215 |
| 9 | 245 | 258 |
| 10 | 243 | 250 |
| 11 | 191 | 198 |

For purposes of comparison, a microstructure-bearing plastic article was made to be identical to that of Example 1 except that the peaks of the master molding surface were allowed to be covered by 0.075 mm of the oligomeric resin composition (i.e., the excess resin was about 43% of the prism depth). T-Test Value was 6.8%, thus showing the importance of restricting the deposited oligomeric resin composition to an amount barely sufficient to fill the cavities of the master molding surface when water-cooled UV lamps are not used in an effort to control the temperature adjacent to the surface of the resin to less than about 50° C.

EXAMPLE 2

A liquid UV curable oligomer resin composition having a viscosity of 1720 cps was prepared by blending together:

| Reactants | Parts |
|---|---|
| Oligomer of Example 1 | 70.8 |
| Isooctyl acrylate | 22.9 |
| 1,6-hexanediol diacrylate | 6.0 |
| 1-hydroxycyclohexyl acetophenone | 0.25 |

This oligomeric resin composition was used as in Example 1 to make a composite TIRF plastic article except that the polyolefin master had a pattern of linear prisms 0.088 mm deep and 0.175 m peak-to-peak, and the thickness of the polycarbonate substrate film was 0.125 mm. The resultant composite TIRF showed a T-Test Value of 3.7%.

EXAMPLE 3

The UV-curable oligomeric resin composition and polyolefin master of Example 2 were employed to form a composite TIRF plastic article except that the transparent substrate film was 0.25-mm poly(ether sulfone). The resultant composite TIRF showed no sign of distortion after being heated at 177° C. for one hour. For comparison, the composite TIRF of Example 2 distorted when heated in the same way.

EXAMPLE 4

The UV-curable oligomeric resin composition and polyolefin master of Example 2 were employed to form a composite TIRF plastic article except that the substrate was kraft paper (0.2 mm thick), one face of which had an aluminum vapor-deposited coating which was laid against the UV-curable resin. The resin was cured by being irradiated through the polyolefin master. The resultant composite TIRF had good integrity and was easily removed from the master. Example 4 shows how an opaque substrate can be positioned immediately behind transparent microstructure by a simple, economical procedure.

EXAMPLE 5

The polyethylene face of a sheet of polyethylene/polypropylene (0.375 mm/1.0 mm) was heat embossed from a nickel-plated copper master tool to provide a negative molding surface having a Fresnel pattern depth ranging from 0.025 mm to 0.125 mm. Using the UV-curable oligomeric resin composition of Example 2 and a polycarbonate substrate film (0.25 mm), a composite plastic Fresnel lens was produced by the procedure of Example 1.

EXAMPLE 6

The UV-curable oligomeric resin composition and polyolefin master of Example 2 were used as in Example 2 to produce a composite TIRF plastic article, the flat side of which was then used as a substrate for forming a second TIRF surface using the same resin and the same master, followed by ultraviolet irradiation through the master. The resulting composite plastic article had identical microstructure at both faces of the polycarbonate film (0.25 mm), with the linear grooves at one surface extending orthogonally to those at the other surface.

EXAMPLE 7

A liquid UV-curable oligomeric resin composition having a viscosity of 2400 cps was prepared by blending together:

| Reactants | Parts |
| --- | --- |
| Acrylate-capped urethane oligomer containing 20% propoxylated neopentyl glycol diacrylate (PHOTOMER 6827, from Henkel Corp.) | 78.1 |
| Isooctyl acrylate | 21.6 |
| 1-hydroxycyclohexyl acetophenone | 0.25 |

Using the master and procedure of Example 1, a composite TIRF plastic article was produced having a T-Test Value of 2.7%.

EXAMPLES 8-13

A liquid UV-curable oligomeric resin composition was prepared by blending the following materials together:

| Reactants | Parts |
| --- | --- |
| Polyether urethane acrylate oligomer (EBECRYL 4826, available from Radcure Specialties, Inc.) | 75 |
| Neopentylglycol propoxylate diacrylate (PHOTOMER 4127) | 25 |
| 2-Hydroxy-2-methyl propiophenone | 0.5 |

This oligomeric resin composition was used as in Example 1 to make composite TIRF plastic articles except using a metal master mold having the same dimensions as the master mold of Example 1. The substrate was a 0.0175 mm biaxially oriented poly(ethylene terephthalate) film and the oligomeric composition was cured by irradiating through the substrate rather than the master mold. Curing was effected by a UV radiation dosage of 400 mJ/cm$^2$ and the excess resin (as a percentage of the pattern depth) was as indicated in Table B. The effect of temperature during curing was monitored by placing the uncured TIRF sandwiches on 0.64 cm thick aluminum plates and equilibrating the assemblies at the temperatures indicated in Table B prior to curing. The temperature of the assembly was also monitored as it exited the UV processing unit. The resulting microstructure-bearing composite TIRF plastic article with its substrate intact was peeled away from the master molding surface, and the replication fidelity was determined by the T-Test Value and the Interferometry Fringe Curvature Test, the results of which are called "Curve Value" in the following tables.

TABLE B

| Example | Excess Resin Thickness | Initial Temp. (°C.) | Exit Temp. (°C.) | Initial T-Test Value (%) | Initial Curve Value |
| --- | --- | --- | --- | --- | --- |
| 8 | 28% | 0 | 13 | 2.24 | 0.28 |
| 9 | 14-28% | 0 | 14 | 2.58 | 0.13 |
| 10 | 21% | 35 | 38 | 3.07 | 0.86 |
| 11 | 14% | 35 | 44 | 2.55 | 1.35 |
| 12 | 21% | 70 | 67 | 5.48 | 1.52 |
| 13 | 14% | 70 | 70 | 5.33 | 1.82 |

The composites of Examples 8-13 were then aged at 70° C., and the T-Test and interferometry test for "Curve Value" repeated after 240 and 480 hours aging. Results of these tests are reported in Table C.

TABLE C

| Example | 240 hr T-Test Value (%) | 240 hr Curve Value | 480 hr T-Test Value (%) | 480 hr Curve Value |
| --- | --- | --- | --- | --- |
| 8 | 1.71 | 0.15 | 2.10 | 0.12 |
| 9 | 2.13 | 0.10 | 2.43 | 0.08 |
| 10 | 2.99 | 0.86 | 3.59 | 0.83 |
| 11 | 2.52 | 1.04 | 3.41 | 1.05 |
| 12 | 4.88 | 1.52 | 6.31 | 1.75 |
| 13 | 4.85 | 1.50 | 6.36 | 1.83 |

Examples 8-10 demonstrate that acceptable fidelity of replication is achieved when the temperature is limited to less than or about 50° C. even when the resin excess exceeds 20%. Examples 12 and 13 show the importance of temperature control as resin thickness increases.

EXAMPLES 14-19

A liquid UV-curable oligomeric resin composition was prepared by blending the following materials together:

| Reactants | Parts |
| --- | --- |
| Polyether urethane acrylate oligomer (EBECRYL 4826) | 35 |
| Polyester urethane acrylate oligomer (PHOTOMER 6019) | 50 |
| Neopentylglycol propoxylate diacrylate (PHOTOMER 4127) | 15 |
| 2-Hydroxy-2-methyl propiophenone | 0.5 |

The procedure of Examples 8-13 was followed to produce microstructure-bearing composite TIRF plastic articles which were subjected to testing for replication fidelity as reported in Table D.

TABLE D

| Example | Excess Resin Thickness | Initial Temp. (°C.) | Exit Temp. (°C.) | Initial T-Test Value (%) | Initial Curve Value |
| --- | --- | --- | --- | --- | --- |
| 14 | 70% | 1 | 16 | 2.03 | 0.08 |
| 15 | 126% | 0 | 13 | 1.83 | 0.83 |
| 16 | 98% | 35 | 45 | 3.01 | 1.10 |
| 17 | 126% | 36 | 45 | 2.68 | 1.14 |

TABLE D-continued

| Example | Excess Resin Thickness | Initial Temp. (°C.) | Exit Temp. (°C.) | Initial T-Test Value (%) | Initial Curve Value |
|---|---|---|---|---|---|
| 18 | 56% | 70 | 72 | 5.16 | 1.94 |
| 19 | 84% | 69 | 70 | 4.75 | 2.39 |

The composites of Examples 14-19 were then aged at 70° C., and T-Test Value and interferometry measurements repeated after 240 and 480 hours aging. Results of these tests are reported in Table E.

TABLE E

| Example | 240 hr T-Test Value (%) | 240 hr Curve Value | 480 hr T-Test Value (%) | 480 hr Curve Value |
|---|---|---|---|---|
| 14 | 3.02 | 0.96 | 4.14 | 1.03 |
| 15 | 2.77 | 1.01 | 3.74 | 0.9 |
| 16 | 3.91 | 2.35 | 5.05 | 1.76 |
| 17 | 3.77 | 1.99 | 5.18 | 1.55 |
| 18 | 5.99 | 2.59 | 7.05 | 2.22 |
| 19 | 5.47 | 2.66 | 7.10 | 3.27 |

Comparison of the data in Tables D and E with the data in Tables B and C reveals that over a range of from about 14% to about 130% excess resin, curring the oligomeric resin composition at higher temperatures resulted in inferior replication fidelity. It should also be noted that T-Test Values and Curve Values for the samples of Examples 14-19, which were prepared with substantially more than 20% excess resin, were higher than the values for the samples of Examples 8-13 which were prepared with significantly less excess resin. However, even in Examples 14-17 where the excess resin exceeded 20%, acceptable replication fidelity was found because the temperature rise during curing was limited to about 50° C. or less. In examples 18-19, where the temperature during curing substantially exceeded 50° C. and the resin excess was not limited to 20% or less, T-Test values were close to or exceeded 5%.

EXAMPLE 20

The TIRF samples of Examples 8, 10 and 12 after 480 hours aging were separately mounted in the T-Test apparatus, and the T-Test Value of each was measured as the film was alternately heated to about 90° C. and allowed to cool. At each change in temperature the T-Test Value was recorded after it had stabilized. A commercially available acrylic TIRF article (SCOTCH Brand Optical Lighting Film, Prod. #2300, available from 3M) was also evaluated under similar conditions. Results are reported in Table F.

TABLE F

| Example | Initial T-Test Value (%) | Hot T-Test Value (%) | Cool T-Test Value (%) | Reheated T-Test Value (%) | Recooled T-Test Value (%) |
|---|---|---|---|---|---|
| 8 | 2.30 | 2.08 | 2.28 | 2.05 | 2.28 |
| 10 | 3.65 | 1.95 | 3.62 | 1.84 | 3.62 |
| 12 | 7.17 | 4.23 | 7.26 | 4.03 | 7.15 |
| Commercial TIRF | 0.98 | 1.26 | 1.00 | 1.30 | 1.00 |

The data in Table F indicate that the TIRF articles of Examples 8, 10, and 12 experience a decrease in the T-Test Value as the films are heated, indicative of stress relief in a film as its temperature approaches the temperature at which its reactive oligomeric resin composition was cured. This behavior stands in contrast to the commercially available TIRF article which shows a higher T-Test Value as it is heated.

EXAMPLE 21

A liquid UV-curable oligomeric resin composition was prepared by blending the indicated materials together:

| Reactants | Parts |
|---|---|
| Polyether urethane acrylate oligomer (EBECRYL 4826) | 40 |
| Polyester urethane acrylate oligomer (PHOTOMER 6008) | 40 |
| Neopentylglycol propoxylate diacrylate (PHOTOMER 4127) | 20 |
| 2-Hydroxy-2-methyl propiophenone | 0.5 |

The oligomeric resin composition at 65°-70° C. was deposited on a rotating metal cylindrical mold that had a 0.178 mm deep TIRF pattern arranged with the grooves running circumferentially. As the cylinder rotated, a polycarbonate substrate was pressed against the resin by a hard rubber roller under a pressure sufficient to leave approximately 0.25 mm of excess resin (approximately 140%) above the TIRF pattern. Rotation of the cylinder carried the uncured composite past a bank of medium pressure ultraviolet lamps, exposing the uncured oligomeric resin composition to a UV dose of 400-600 mJ/cm$^2$ to produce a continuous TIRF article. The temperature of the cylindrical metal mold was controlled at various temperatures with circulated heat exchange oil to adjust the cure temperature. T-Test Values for TIRF articles cured at the various temperatures are reported in Table G.

TABLE G

| Cure Temperature (°C.) | T-Test Value |
|---|---|
| 65 | 3.0 |
| 55 | 2.5 |
| 40 | 2.1 |

This example demonstrates that lower cure temperatures in a continuous process improve replication fidelity in a manner similar to that observed in batch processes.

EXAMPLE 22

The TIRF article of Example 21 that had been cured at 65° C. was formed into tubes of approximately 50 cm length and two different diameters, and the light transport of the tubes determined. The procedure used to determine the light transport involved:
a) determining the light source intensity with the integrating sphere/radiometer apparatus described above in the procedure for T-Test Value (except that the aperture was about 9 cm) without the sample tube in place,
b) placing the sample tube in a rigid acrylic tube fitted with a light source at one end of the tube and the integrating sphere/radiometer apparatus at the opposite end of the tube, and
c) determining the intensity of the light transmitted through the tube.

Based on the intensity measurements, a transport factor, which is defined as:

$$\text{Transport Factor} = \frac{-\text{tube length in diameters}}{10 \times \log(\text{transport/source})}$$

was calculated for the sample tubes. Sample tubes fabricated from the aforementioned commercially available acrylic based TIRF article (see Example 20) were also evaluated in this test for comparative purposes. The data for the TIRF article of Example 21 as well as the commercially available TIRF article are reported in Table H.

TABLE H

| TIRF | Cylinder Dia. (cm) | Source Intensity | Measured Transport | Transport Factor Diam./Decibel |
|---|---|---|---|---|
| Commercial | 7.0 | 1.007 | 0.859 | 10.53 |
| Commercial | 4.8 | 0.933 | 0.677 | 7.66 |
| Ex 21 | 7.0 | 1.005 | 0.820 | 8.23 |
| Ex 21 | 4.8 | 0.949 | 0.739 | 9.82 |

These data indicate that, at a diameter of 7 cm, the conventional acrylic based TIRF article has superior optical properties, but, surprisingly, at a diameter of 4.8 cm, the TIRF article of Example 21 has superior optical properties.

EXAMPLE 23

EBECRYL 4826, a liquid polyether urethane acrylate oligomer composition, was used as in Example 1 to make a composite TIRF article except that the master mold was metal and had a 0.089 mm deep TIRF pattern, and a biaxially oriented poly(ethylene terephthalate) film (0.178 mm thick) was used as the substrate. The oligomeric resin composition was cured with electron beam radiation by exposing the uncured composite to 3 megarads of radiation at 300 kv from an electron beam apparatus (Energy Sciences, Inc.). After the resulting composite plastic article was removed from the master mold, its T-Test Value was determined to be 3.9%.

EXAMPLES 24-25

Example 1 above was repeated except that the resin composition was cured under a water-cooled UV lamp that limited the temperature immediately adjacent to the resin surface to less than 50° C. Temperature was determined by touching the polycarbonate substrate which overlay the resin. The substrate temperature approximated the normal temperature of the human body (about 37° C.). T-Test Values are shown below in Table I for two different excess resin thicknesses.

TABLE I

| Example | Excess Resin (mm) | Thickness (%) | T-Test Value |
|---|---|---|---|
| 24 | 0.025 | 14 | 3.5% |
| 25 | 0.203 | 116 | 4.0% |

EXAMPLES 26-27

Example 2 above was repeated except that the master had a pattern of linear prisms 0.175 mm deep and 2-ethylhexyl acrylate was substituted for isooctyl acrylate. Examples 26-27 were polymerized under a water-cooled UV lamp which limited the temperature adjacent to the resin surface to less than 50° C. as explained above for examples 24-25. T-test Values for two different excess resin thicknesses are shown below in Table J.

TABLE J

| Example | Excess Resin (mm) | Thickness (%) | T-Test Value |
|---|---|---|---|
| 26 | 0.025 | 14 | 3.5% |
| 27 | 0.203 | 116 | 4.8% |

EXAMPLES 28-30

Example 2 above was repeated except that a master having a pattern of linear prisms 0.175 mm deep was employed. The resin was polymerized under a water-cooled UV lamp which limited the temperature to less than about 50° C. as described above for examples 24-27. T-Test Values for three different excess resin amounts are shown below in Table K.

TABLE K

| Example | Excess Resin (mm) | Thickness (%) | T-Test Value |
|---|---|---|---|
| 28 | 0.0 | 0 | 2.1% |
| 29 | 0.203 | 116 | 2.3% |
| 30 | 0.275 | 157 | 4.0% |

Examples 24-30 show the beneficial effect of limiting the temperature adjacent to the surface of the resin during the polymerization thereof to less than about 50° C. Even in cases where the excess resin was greater than 100%, the resulting article demonstrated a T-Test Value of less than 5% indicating its usefulness as a TIRF. Although the temperature adjacent to the surface of the resin was controlled with the aid of water-cooled UV lamps, other techniques for temperature regulation may be used as explained more fully above. The significance of Examples 24-30 becomes more apparent when compared with Example 1. In Example 1, an uncooled lamp was used and a resin excess of 48% resulted in a T-Test Value of 6.8%. In Example 1, however, acceptable replication fidelity was achieved by restricting the excess resin to less than 20%.

EXAMPLES 31-36

Example 1 above was repeated for Examples 31-33 and the resin thickness was varied as shown below. The temperature at the surface of the polymerizing resin composition was measured with an optical pyrometer and T-Test Values were measured as described above. Examples 34-36 are the same as examples 31-33 except that the UV lamps were water cooled to limit the temperature adjacent to the surface of the resin to less than 50° C. Results are shown below in Table L.

TABLE L

| Example | Temperature (°C.) | Excess Resin (mm) | Thickness (%) | T-Test Value |
|---|---|---|---|---|
| 31 | 48 | 0.0 | 0 | 2.0 |
| 32 | 48 | 0.025 | 14 | 2.4 |
| 33 | 60 | 0.050 | 29 | 4.9 |
| 34 | 28 | 0.0 | 0 | 2.1 |
| 35 | 31 | 0.025 | 14 | 2.1 |
| 36 | 28 | 0.050 | 29 | 2.3 |

Table L shows that if the resin excess is limited to no more than about 20%, excellent fidelity of replication (T-Test Value less than 2.5%) is possible even where the temperature adjacent to the polymerizing resin surface is not controlled. However, at large resin excesses (e.g., greater than about 20%), it is necessary to restrict the temperature to less than about 50° C. to achieve comparable replication fidelity.

Thus, fidelity of replication is related to two parameters, the degree of resin excess and the temperature adjacent to the surface of the polymerizing resin. If the temperature is limited to less than about 50° C., excellent replication is possible even if the resin excess is greater than 100%. On the other hand, if the resin excess does not exceed 20%, then temperature control is a less important parameter.

Reasonable variations or modifications of the foregoing specification and drawing are possible without departing from the scope of the invention which is defined in the accompanying claims.

The embodiments for which an exclusive property or privilege is claimed are defined as follows:

1. A method of producing a composite plastic article that has a utilitarian microstructure, which microstructure is at least 0.025 mm in depth, said method comprising the steps of:
   a) preparing a UV-curable oligomeric resin composition of a one-part, solvent-free, radiation addition-polymerizable, crosslinkable, organic oligomeric composition having hard segments and soft segments;
   b) depositing a bead of that oligomeric resin composition along one edge of a master negative microstructure molding surface;
   c) covering the master with a preformed substrate, at least one of the master and substrate being flexible;
   d) applying force progressively to the substrate to advance the bead of resin while applying sufficient pressure to fill the cavities of the master such that the deposited resin does not protrude beyond the cavities to more than 20% of the depth of the cavities;
   e) curing the deposited oligomeric resin by ultraviolet radiation to provide a composite of said substrate and cured oligomeric resin; and
   f) removing the resulting microstructure-bearing composite of the substrate and cured resin.

2. A method as defined in claim 1 wherein the viscosity of the resin composition in step a) is from 1,000 to 5,000 cps.

3. A method as defined in claim 1 wherein the oligomeric resin composition includes a photoinitiator in step a) in an amount of from 0.1 to 1% by weight of the resin composition.

4. A method as defined in claim 3 wherein the amount of photoinitiator is from 0.1 to 0.5% by weight of the resin composition.

5. A method as defined in claim 1 wherein pressure is applied in step d) such that the deposited oligomeric resin composition does not protrude beyond said cavities to more than 10% of the depth of the cavities.

6. A method as defined in claim 1 wherein the microstructure makes the composite plastic article a total internal reflecting film.

7. A method as defined in claim 6 wherein the microstructure comprises linear prisms.

8. A method as defined in claim 1 wherein said utilitarian microstructure comprises optically utilitarian discontinuities in the surface of said composite plastic article.

9. A method of producing a composite plastic article that has a utilitarian microstructure, which microstructure is at least 0.025 mm in depth, said method comprising the steps of:
   a) preparing a UV-curable oligomeric resin composition of a one-part, solvent-free, radiation addition-polymerizable, crosslinkable, organic oligomeric composition having hard segments and soft segments;
   b) depositing a bead of that oligomeric resin composition along one edge of a master negative microstructure molding surface;
   c) covering the master with a preformed substrate, at least one of the master and substrate being flexible;
   d) applying force progressively to the substrate to advance the bead of resin while applying sufficient pressure to fill the cavities of the master;
   e) curing the deposited oligomeric resin by ultraviolet radiation to provide a composite of said substrate and cured oligomeric resin while keeping the temperature adjacent to the surface of the deposited oligomeric resin from rising not more than about 30° C. above room temperature; and
   f) removing the resulting microstructure-bearing composite of the substrate and cured resin.

10. A method as defined in claim 9 wherein the viscosity of the resin composition in step a) is from 1,000 to 5,000 cps.

11. A method as defined in claim 9 wherein the oligomeric resin composition includes a photoinitiator in step a) in an amount of from 0.1 to 1% by weight of the resin composition.

12. A method as defined in claim 11 wherein the amount of photoinitiator is from 0.1 to 0.5% by weight of the resin composition.

13. A method as defined in claim 9 wherein pressure is applied in step d) such that the deposited oligomeric resin composition does not protrude beyond said cavities to more than 20% of the depth of the cavities.

14. A method as defined in claim 9 wherein the temperature during step e) does not rise above about 50° C.

15. A method as defined in claim 9 wherein the microstructure makes the composite plastic article a total internal reflecting film.

16. A method as defined in claim 15 wherein the microstructure comprises linear prisms.

17. A method as defined in claim 9 wherein said utilitarian microstructure comprises optically utilitarian discontinuities in the surface of said composite plastic article.

18. A method of producing a composite plastic article that has a utilitarian microstructure, which microstructure is at least 0.025 mm is depth, said method comprising the steps of:
   a) preparing a UV-curable oligomeric resin composition of a one-part, solvent-free, radiation addition-polymerizable, crosslinkable, organic oligomeric composition having hard segments and soft segments;
   b) depositing a bead of that oligomeric resin composition along one edge of a master negative microstructure molding surface;
   c) covering the master with a preformed substrate, at least one of the master and substrate being flexible;
   d) applying force progressively to the substrate to advance the bead of resin while applying sufficient pressure to fill the cavities of the master;
   e) curing the deposited oligomeric resin by ultraviolet radiation to provide a composite of said substrate and cured oligomeric resin while limiting the temperature adjacent to the surface of the deposited oligomeric resin; and
   f) removing the resulting microstructure-bearing composite of the substrate and cured resin
   whereby the composite plastic article demonstrates a T-Test value of about 5% or less.

* * * * *

UNITED STATES PATENT AND TRADEMARK OFFICE
CERTIFICATE OF CORRECTION

PATENT NO. : 5,183,597
DATED : February 2, 1993
INVENTOR(S) : Shih-Lai Lu

It is certified that error appears in the above-indentified patent and that said Letters Patent is hereby corrected as shown below:

Column 3, lines 46-47, "composititie" should read --composite--.

Column 13, line 25, "curring" should read --curing--.

Signed and Sealed this

Eleventh Day of January, 1994

Attest:

BRUCE LEHMAN

*Attesting Officer*     *Commissioner of Patents and Trademarks*